United States Patent [19]

Nishimura et al.

[11] 4,323,607
[45] Apr. 6, 1982

[54] HEAT SHRINKABLE COVERS

[75] Inventors: Hiroshi Nishimura; Tetsuo Monma; Minoru Yoshida, all of Yokohama; Kazunari Kirimoto, Chiba; Yoshio Hayamizu, Goi; Toshio Nagasawa, Kyoto, all of Japan

[73] Assignees: UBE Industries, Ltd.; The Furukawa Electric Co., Ltd., both of Tokyo, Japan

[21] Appl. No.: 68,761

[22] Filed: Aug. 23, 1979

[30] Foreign Application Priority Data

Sep. 1, 1978 [JP] Japan .................................. 53-106199
Sep. 1, 1978 [JP] Japan .................................. 53-106200

[51] Int. Cl.³ .............................................. H05B 3/10
[52] U.S. Cl. .................................. 219/213; 156/84; 156/86; 174/DIG. 8; 285/DIG. 10; 339/DIG. 1; 264/DIG. 71; 428/226; 428/229; 428/247; 428/251; 428/256; 428/259; 428/288; 428/293; 428/913; 428/36; 53/442; 156/275
[58] Field of Search ............... 264/230, 27, 342 R, 264/DIG. 71; 428/913, 36, 226, 229, 379, 247, 251, 256, 259, 293, 288; 174/92, 35 C, DIG. 8, 84 R, 87, 88 R, 91, 92, 138 F, 35 R; 156/84, 85, 86, 49, 275; 285/381, 423, DIG. 10; 219/505, 548, 549, 552, 553; 339/DIG. 1

[56] References Cited

U.S. PATENT DOCUMENTS

| T905,001 | 12/1972 | Day ......................................... 264/27 |
| 1,960,120 | 5/1934 | Möhring ............................... 156/275 |
| 3,049,465 | 8/1962 | Wilkins ................................. 156/275 |
| 3,466,210 | 9/1969 | Wareham ................................ 156/86 |
| 3,532,666 | 10/1970 | Csaszas ................................. 428/379 |
| 3,612,803 | 10/1971 | Klaas .................................... 156/275 |
| 3,669,157 | 6/1972 | Woodall, Jr. et al. ........ 174/DIG. 8 |
| 3,694,282 | 9/1972 | Ribbels et al. ....................... 156/275 |
| 3,968,015 | 7/1976 | Nyberg ........................... 174/DIG. 8 |
| 4,085,286 | 4/1978 | Horsma et al. ..................... 428/913 |
| 4,177,376 | 12/1979 | Horsma et al. ..................... 219/548 |
| 4,177,446 | 12/1979 | Diaz ..................................... 219/549 |
| 4,232,712 | 11/1980 | Squires ......................... 285/DIG. 10 |

Primary Examiner—Stanley S. Silverman
Attorney, Agent, or Firm—Charles E. Pfund

[57] ABSTRACT

In a heat shrinkable synthetic resin cover adapted to seal a joint between two pipes or an electric cable, the cover is made of a rectangular sheet shaped cross-linked polymer and a flexible electric heater covered by a cross-linked polymer contained in a heat shrinkable synthetic resin member such that the electric heater crosses at right angles an inherent direction of heat shrink of the member so as not prevent inherent heat shrink thereof.

14 Claims, 6 Drawing Figures

HEAT SHRINKABLE COVERS

BACKGROUND OF THE INVENTION

This invention relates to a heat shrinkable synthetic resin cover containing a heat generating element and adapted for use as an anticorrosion coating member applied to conduit joints, and a protective coating member for the joints of electric wires and cables.

Heat shrinkable synthetic resin covers have been widely used for protection against corrosion and mechanical impact of joints of natural gas or petroleum pipelines or joints of wires or cables.

For example, after applying a sheet or tube shaped heat shrinkable synthetic resin cover about a joint of steel pipes or electric wires or cables, the cover is heated from outside with the flame of a gas burner to cause the cover to heat shrink so as to cause it to tightly fit and adhere to the joints.

Examples of such heat shrinkable covers used at such joints are described in Japanese patent laid open specification No. 119,684 of 1977 (corresponding to U.S. Patent Application Ser. No. 664,275 filed on Mar. 5, 1976) and U.S. Pat. No. 3,086,242.

According to the prior art of coating a joint, when a heat shrinkable synthetic resin cover is applied about the joint, a suitable external source of heat was required to shrink the cover. When covering the joint with the heat shrinkable cover, unless the heat shrinkable cover is uniformly heated about the entire periphery there are such problems as non-uniform shrinkage causing air voids and uneven thickness of the cover. Although such coating operations are generally performed in the field, use of a heating furnace is not suitable for the field work so that in most cases gas burners have been used. With the gas burner it is generally difficult to heat uniformly all the periphery at the same time.

For example, when a heat shrinkable cover is wrapped about a joint of pipes having an outer diameter larger than one meter, the area of the cover heated at a time by a LPG gas burner is relatively narrow so that, it is impossible to uniformly heat the entire surface of the cover. In order to uniformly heat the entire surface, it is necessary to use a special multiple head burner or to simultaneously perform the heating operation with many skilled operators at the same time.

Where the field is in extremely cold areas or windy areas, it has been impossible to uniformly and simultaneously heat the entire surface of the heat shrinkable cover with external heating means. Nonuniform heating results in destruction of the cover due to overheating or an insufficient bonding between the joint and the cover thus forming an air gap therebetween or nonuniform wall thickness of the cover. Thus, as it is impossible to maintain the corrosion proof property as well as the protective property at the joints over a long period, and since nonuniform heating results in nonuniform residual stress in the coating the durability and weather proofness of the coated layer degrade thus making it impossible to use it over a long period.

SUMMARY OF THE INVENTION

Accordingly, it is an object of this invention to provide a novel heat shrinkable synthetic resin cover containing an electric heater so that the cover can be uniformly heated from inside by passing electric current through the heater without using any external heating source.

Another object of this invention is to provide an improved heat shrinkable synthetic resin cover that can be applied readily in extremely cold regions, or to the joint of pipes having large diameter.

Still another object of this invention is to provide a heat shrinkable synthetic resin cover that can be uniformly heated and cause to shrink thus forming durable and weather proof covers.

A further object of this invention is to provide a sheet shaped shrinkable cover wherein the opposite ends of the cover wrapped about a joint can be firmly joined each other.

According to this invention, there is provided a heat shrinkable synthetic resin cover of such a type as sheet or tube comprising a heat shrinkable synthetic resin member, characterized in that a flexible electric heating member coated with a cross-linked polymer is embedded in the heat shrinkable synthetic resin member such that the electric heating member does not preclude heat shrinkage of the heat shrinkable synthetic resin member in a direction inherent thereto.

Usually, the heat shrinkable synthetic resin member is made of a polymer in the form of a rectangle and an electric heating wire is distributed therein in a zig-zag configuration such that it crosses substantially at right angles an inherent direction of heat shrink of heat shrinkable synthetic resin member.

DESCRIPTION OF THE PREFERRED EMBODIMENTS

Figure 1:
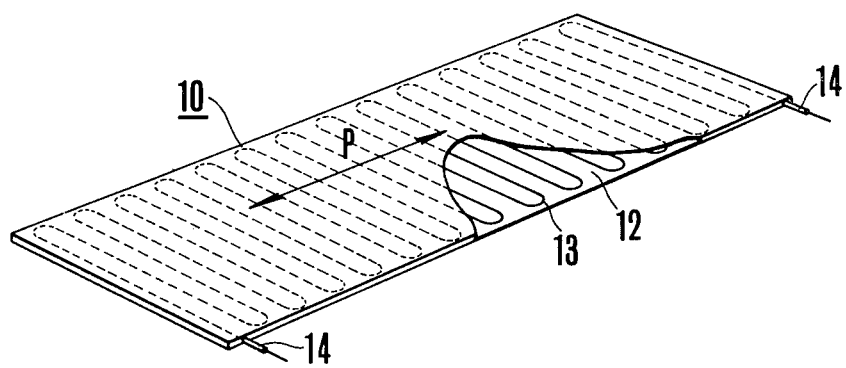
FIG. 1 is a perspective view showing one embodiment of a sheet like heat shrinkable synthetic resin cover embodying the invention.

A heat shrinkable synthetic resin member 12 comprising the heat shrinkable cover 10 of this invention should be a resinous shaped material shrinkable in substantially one direction and to be improved in heat resistant property at high temperatures and heat shrinkability it is advantageous that the material is made of a cross-linked polymer. The heat shrinkable member 12 may be a crystalline synthetic resin film imparted with heat shrinkability substantially in one direction by a well known method. Especially in this invention, it is advantageous that the member 12 comprises a sheet comprising a cross-linked polymer for improving the heat resistant property.

The heat shrinkable crystalline synthetic resin film or sheet may be prepared by a conventional method comprising the steps of drawing a blank of the film in substantially one direction at an elevated temperature and then lowering the temperature under a tension load caused by the elongation so as to solidify the film with stress remaining in the film.

Heat resistant property of the film can be imparted by cross-linking a polymer comprising the film with a cross-linking agent or by causing a cross-linking by irradiating the polymer with electron beams or radioactive radiations. Such cross-linking reaction may be effected before or after the step of imparting the heat shrinkability to the film.

The heat shrinkable synthetic resin member 12 may comprise a single layer or a laminate which have been imparted with the heat shrinkability and heat resistance property in a manner described above.

The lamination may be prepared, for example, by tightly wrapping a film 12 which has been imparted with heat shrinkability and heat resistant property about a roller to a desired thickness, applying a shape holding tape or sheet about the lamination, and heating the assembly thereby fusing together all layers of the lamination.

The film utilized to prepare the heat shrinkable and heat resistant member may be made of a crystalline resin, but it is advantageous that the film is composed of a polymer having a gel fraction of 20 to 65%, preferably 25 to 60%, and selected from a group consisting of cross-linked ethylene polymers, for example, cross-linked polyethylene, cross-linked polyvinyl chloride, silicone rubbers, ethylene-propylene copolymer elastmers. It was found that films made of cross-linked polyethylene having a gel fraction of 30 to 50% are most suitable.

The term gel fraction used herein means weight percent of residual of 0.15 gr. of the sample after the extraction of 24 hours at 120° C. with 30 ml. of xylene, and drying for more than 16 hours at 80° C.

The heat shrinkable synthetic resin member made of a cross-linked polymer having a gel fraction or a solvent unextractable fraction of less than 20% is not suitable because of its poor heat shrinkability and poor heat resistant property. With such a member it is not easy to obtain heat shrinkable covers that are uniform in thickness, and do not break when exposed to high temperature. Films made of polymers having a gel fraction of larger than 65% was also found to be unsuitable because of their poor bonding force between the layers when a lamination of the heat shrinkable synthetic resin members is formed.

As above described, the heat shrinkable film is prepared by drawing the blank in one direction at high temperature and then cooling the elongated film, and such film has sufficiently heat shrinkability substantially in one or inherent direction so that it is suitable to prepare the heat shrinkable member of this invention. When laminating such films care should be taken to align the direction of shrinking (inherent direction of heat shrink P) of respective films for the purpose of ensuring a heat shrinkable member which shrinks substantially in only one direction when heated.

In the following description, the direction in which the films manifest a maximum heat shrinkability in the same direction as their direction of elongation is designated as a direction P of inherent heat shrink.

According to this invention the heat shrinkable synthetic resin cover 10 contains therein an electric heater 13 comprising a flexible conductor coated with a cross-linked polymer. Use of a cross-linked polymer is advantageous because it can maintain the electric conductor in good insulated state when a high temperature is applied to laminate the electric heater 13 with heat shrinkable synthetic resin members 12 and when a high temperature is applied to heat shrink the heat shrinkable cover 10 after it has been applied to a joint between pipes or cables.

The cross-linked polymer may be formed by cross-linking thermoplastic resins, for example, ethylene polymers, polypropylen, polyvinyl chloride, ethylene-propylene polymers with electron beams or radioactive radiations or chemical cross-linking agents, for example peroxides or suitable curing agents. The cross-linking reaction may be performed before or after coating the conductor with the thermoplastic resin.

Preferably, the degree of cross-linking of the thermoplastic resin utilized to insulate the conductor may be 20–60%, preferably 25–55%, more preferably 30–45% in terms of the gel fraction. It was found that a cross-linked polyethylene having a gel fraction of 25–55% is most suitable to insulate the conductor.

When the gel fraction of the cross-linked polymer is higher than 60%, and when the insulated conductor is inserted between two heat shrinkable synthetic resin members 12 in a manner to be described later, it is difficult for the insulated conductor to be fused with the members 12 to form an integral structure. On the other hand, when the gel fraction is lower than 20%, the heat resistant property of the cross-linked polymer is not sufficient and it melts to flow so as to make the short circuit between the conductors.

The flexible conductor may be a fine metal wire or strands thereof which can generate heat when current flows therethrough. Fine copper wire or strands thereof are most suitable, but wires of copper alloys or nickel alloys can also be used depending upon the manner of heat shrink.

Use of a flexible conductor insulated with a cross-linked polymer as the electric heater 13 constitutes one of important features of this invention.

One of the advantages lies in that the flexibility of the conductor permits it to distribute at a desired uniform density in the heat shrinkable synthetic resin cover 10 irrespective of the shape of the conductor. Furthermore, the flexibility of the conductor assures the flexibility of the heat shrinkable synthetic resin cover 10 both at room temperature and at elevated temperature.

Where a bare conductor not coated with a cross-linked polymer is used as an electric heater, when heat is applied to the inserted conductor embedded in a lamination of the heat shrinkable synthetic resin members or to cause the heat shrinkable cover to shrink about the joint, the bare conductor tends to move at the time of the heat shrink thus causing adjacent turns to contact or overlap with each other thus causing short circuiting or breakage of the wire. If such fault occurs, a portion or all of the conductor can not pass current thus causing nonuniform heat shrink of the cover 10.

In contrast, according to this invention, since the conductor is coated with a cross-linked polymer, the conductor would not be displaced to cause short circuit or breakage when heat is applied to the laminated heat shrinkable members 12 or to the heat shrinkable cover.

Even when the cross-linked polymer utilized to insulate the conductor is heated to a temperature higher than the melting point of the polymer for causing the cover 10 to heat shrink, the coated polymer would not melt because its heat resistance property has been increased due to the cross-linking reaction. Accordingly, variation in the thickness of the coated polymer is small thus making it possible to complete the heat shrink in a short time and at a high temperature.

Where a cross-linked polyethylene having a gel fraction of 30-45% is used to insulate the conductor the cross-linked polymer adheres well to the heat shrinkable synthetic resin members when they are laminated thus preventing formation of air voids in the lamination whereby it is possible to provide an integral homogeneous lamination having a high heat resistant property.

Figure 2:
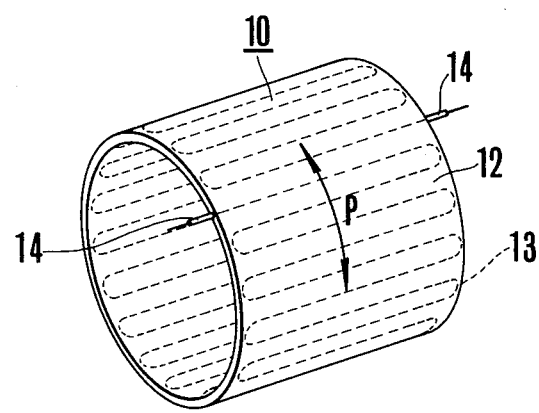
FIG. 2 is a perspective view of a cylindrical cover.

As shown in FIGS. 1 and 2, the flexible electric heater 13 should be contained throughout the heat shrinkable cover 10 such that the electric heater will not prevent the heat shrink of the heat shrinkable members 12 in its inherent direction of heat shrink P.

The flexible heater 13 may be contained in various manners in the heat shrinkable cover 10. For example, the conductor may be arranged to cross the inherent direction P in which the maximum heat shrink of the members 12 occurs.

Advantageously, the conductor should be densely and uniformly arranged between the members 12 such that the conductor intersects the direction P at an angle between 60° and 90°. Thus, it is advantageous to dispose the conductor such that it would not extend in parallel with the inherent direction P of the heat shrink of the members 12 for a substantial length.

It is advantageous to arrange the conductor to cross the inherent direction P of heat shrinkage of the members 12 at substantially right angles with a spacing of 0.3-2 cm, preferably 0.4-1 cm between adjacent turns.

To dispose a continuous and long conductor between the heat shrinkable members 12 it is desirable to change the direction of the conductor, that is to reverse its direction in the inside or outside at both sides of the heat shrinkable members 12. When the direction of the conductor is reversed on the outside of both sides, sufficient heating is performed at both sides just in the same manner as at the central portion.

Figure 3:
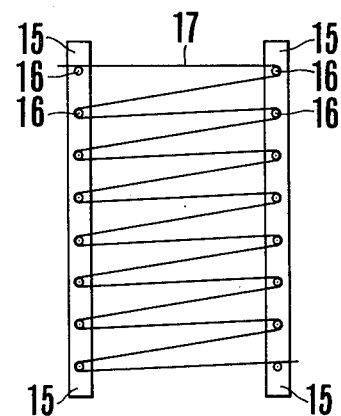
FIGS. 3 and 4 are a plan view and a side view showing one example of the steps of manufacturing an electric heating element to be contained in the heat shrinkable synthetic resin cover of this invention.
Figure 4:
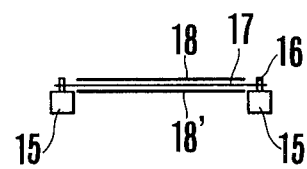

To prepare the heat shrinkable cover 10 of this invention containing the flexible heating member arranged between the heat shrinkable members 12 in a manner as above described, the heating member is firstly prepared by repeatedly passing a flexible resistance wire 17 coated with a cross-linked polymer successively about a plurality of suitably spaced pins 16 secured to a pair of parallel bars 15 as shown in FIG. 3. Then, a pair of synthetic resin films 18 and 18' are placed on both sides of the conductor as shown in FIG. 4. Thereafter, the synthetic resin films 18 and 18' are heated together to form a unitary sheet 19 shown in FIG. 5 in which zigzag shaped conductor is securely held. Then, the sheet 19 is clamped between heat shrinkable synthetic resin members 12 and heated to form an integral lamination.

Figure 6:
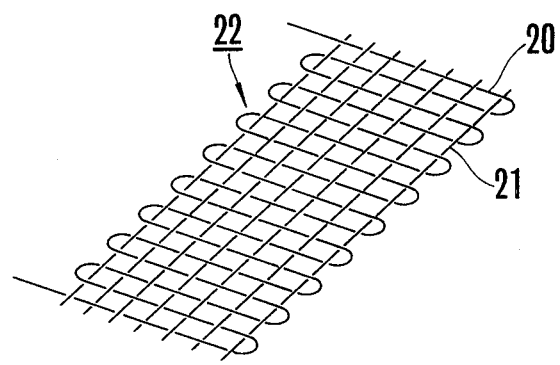

FIG. 6 shows a net shaped heat element for manufacturing the heat shrinkable cover 10.

Thus, a flexible resistance wire 20 coated with a cross-linked polymer is suitably combined with linear members 21 (for example, strings or cords) of a thermoplastic resin so as to form a wire net member 22, as shown in FIG. 6, with the conductor utilized as wefts and the other as the warps. Then the wire net member 22 is clamped between the heat shrinkable members 12 and then heated to form an integral lamination.

As above described, when disposing the sheet 19 or wire net member 22 between the heat shrinkable synthetic resin members 12 for the purpose of preparing the heat shrinkable cover 10, care should be taken such that the resistance wire 17 or 20 of the sheet 19 or wire net member 22 would not extend in parallel with the direction of heat shrinkage P of the members 12 but intersects the direction of heat shrinkage P.

If the heating member 13 comprises a single long conductor, the resistance would become too high to permit the flow of current necessary to generate sufficient heat, so that it is desirable to divide the conductor into a plurality of sections and connect them in parallel.

The heat shrinkable cover 10 containing a heating member 13 is provided with at least one pair of terminals extending to the outside of the cover to pass electric current through the conductor. As above described, where the conductor is divided into a plurality of sections which are connected in parallel, a corresponding member of the terminal pairs are provided.

The heat shrinkable cover 10, that is the heat shrinkable members 12, may have any desired configuration so long as they can accommodate the heating member 13 in a prescribed manner. The heat shrinkable members 12 are preferred to have a rectangular sheet or tabular form because of their easiness of manufacturing and application to a joint between pipes or cables. Especially, heat shrinkable cover 10 (FIG. 1) comprising flat sheet shaped heat shrinkable synthetic resin members 12 is easy to warp about joints between large diameter steel pipes already installed.

It is advantageous to apply a suitable bonding agent to one surface of the heat shrinkable cover 10 which is to be brought into contact with the joint for increasing the bonding force between the cover and the pipes or cables. As the bonding agents may be mentioned pressure sensitive bonding agents and heat sensitive bonding agents.

Preferably, the thickness of the heat shrinkable cover 10 of this invention may be about 0.5 to 5 mm.

While a heat shrinkable film is wrapped about a drum, not shown, to form a lamination, the sheet shaped or wire net shaped heating elements are interposed between predetermined turns of the lamination and release paper strip is also interposed between the predetermined turns. After wrapping, the assembly is heated to obtain an integral cylindrical lamination and then the cylindrical lamination is cut at the portions where the release paper strip had been interposed.

Some examples of the method of preparing the heat shrinkable cover of this invention will now be described in the following.

EXAMPLE 1

7 copper wires each having a diameter of 0.10 mm were twisted together and a polyethylene coating was applied onto the strand to obtain an insulated electric wire having an outer diameter of 0.65 mm. The electric wire was then irradiated with electron beams to effect a cross-linking reaction of the coated polyethylene to a degree of 38% gel fraction.

Figure 5:
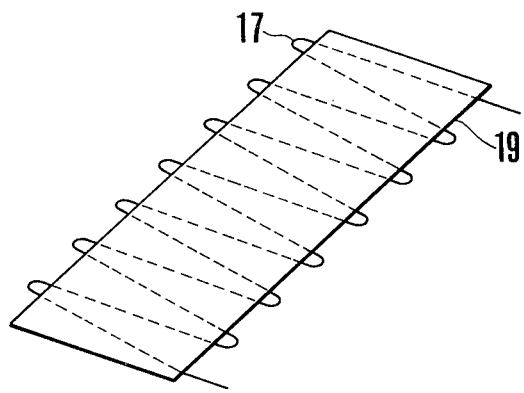
FIGS. 5 and 6 are perspective views showing electric heating elements to be contained in the heat shrinkable synthetic resin cover of this invention.

The electric wire 17 coated with the cross-linked polyethylene was then successevely passed, in a zig-zag form, about a plurality of pins 16 mounted on a pair of parallel bars 15 spaced 700 mm from each other as shown in FIG. 3, the spacing between adjacent pins being about 5 mm. Then, cross-linked polyethylene films 18 and 18' were placed on both sides of the zig-zag shaped resistance wire 17 to temporarily hold the electric wire by the edges of the cross-linked polyethylene films 18 and 18' to obtain a sheet 19 as shown in FIG. 5 in which the electric wire is distributed uniformly.

Each one of the films 18 and 18' utilized at this time had a thickness of 0.15 mm, a width of 680 mm, a gel fraction of 48% and percentage of shrinkage of 40%. Then four turns of the heat shrinkable synthetic resin film were wrapped about a mandrel with one turned release paper, not shown, having a diameter of 650 mm. The synthetic resin film was made of a cross-linked polyethylene film having a width of 680 mm, a gel fraction of 48% and percentage of shrinkage of 40%. Thereafter, one layer of the sheet 19 containing the electric wire was applied, and then 6 turns of the above described synthetic resin film were wrapped on the sheet 19 under pressure. The stack was then placed in a thermostatic tank, not shown, and heated at 180° C. for 40 minutes thereby fusing together adjacent turns.

During the heating, the films constituting the heat shrinkable cover of this invention are pressed together, and release papers and cloth tapes were sequentially wrapped on the upper most layer under pressure so as to prevent undesirable shrinkage. Thereafter, the assembly was cooled to room temperature and the mandrel was removed thus obtaining a tube of the heat shrinkable synthetic resin cover having an inner diameter of 635 mm and containing a tape shaped heating member.

After mounting the cover tube on a steel pipe having an outer diameter of 650 mm the coated wire was divided into 6 sections to expose the conductors at the bent back portions between the divided sections to provide taps for connecting in parallel the divided sections. Current of 55 A was passed under 120 V through the parallelly connected wires. Of course the electric wire was divided such that respective sections would have the same resistance value. Otherwise currents flowing through respective sections would become unequal thus failing to produce uniform heating. The cover tube thus prepared would completely and uniformly shrink within 5 minutes and strongly adhered to the steel pipe.

EXAMPLE 2

7 copper wires, each having a diameter of 0.1 mm were twisted together and the resulting strand was coated with a polyethylene to form a coated electric wire having an outer diameter of 0.65 mm. The coated wire was then irradiated with electron rays or radioactive radiations to form a cross-linked structure having a gel fraction of 42%.

Then a wire net structure or a matrix shaped structure as shown in FIG. 6 was obtained by using the cross-linked polyethylene coated wires 20 as the wefts, and polyethylene strings 22 as the warps, the pitches between adjacent warps and wefts being 5 mm respectively. A single and continuous coated wire 20 was used. The warps 21 may be constituted by a single continuous strand like the wefts or may be independent of with each other.

Then four turns of a cross-linked polyethylene film having a gel fraction of 48%, a thickness of 0.15 mm, and a percentage of shrinkage of 35% were formed on a mandrel which can reduce its diameter having an outer diameter of 1500 mm. The polyethylene film was an inherent direction of heat shrink P extending in the longitudinal direction of the film. The one turn of the wire net shaped structure 22 was applied on the polyethylene film such that the parallel portions of the coated wire would be at right angles with respect to the direction of heat shrink P of the cross-linked polyethylene film.

Then a cross-linked film is again applied onto the wire net shaped structure 22. The lamination thus formed was put into a thermostatic tank and heated for 40 minutes at a temperature of 200° C. to fuse together successive turns each other. After cooling the mandrel was removed to obtain a tube of a heat shrinkable synthetic resin cover. The tube had a configuration similar to that shown in FIG. 2. In the tube thus obtained the polyethylene covering the electric conductor and the polyethylene strings were completely fused together and became integral with the cross-linked polyethylene film without forming any void between adjacent elements.

After mounting the cover tube on a steel pipe having an outer diameter of 1450 mm, the coated electric wire was divided into equal 12 sections which were connected in parallel and passed with current of 110 A for about 5 minutes under a voltage of 120 V. As a result, the cover tube was uniformly shrunk along the entire periphery thus firmly fitted to the steel tube without forming any burnt portions.

EXAMPLE 3

The cross-linked polyethylene coated electric wire used in Example 2 was substituted by a strand of 17 soft copper wires each having a diameter of 0.08 mm and coated with a baked polyurethane enamel, and a cover tube was prepared under the same conditions as in Example 2. Again, the polyurethane coating, the polyethylene strands and the cross-linked polyethylene film were perfectly integrated together without forming any voids. The cover tube prepared in this manner was heated by the heating element to uniformly heat shrink around the entire periphery.

EXAMPLE 4

16 copper wires each having a diameter of 0.08 mm were twisted together and the strand was coated with polyethylene to obtain a coated electric wire, which was then irradiated with electron beams to obtain an electric wire coated with a cross-linked polyethylene having a gel fraction of 39%. The coated wire was then arranged in a zig-zag form with a jig shown in FIG. 3 and then clamped between cross-linked polyethylene films each having a thickness of 40 microns and a gel fraction 21%. Then the assembly was heat fused to form a long sheet having a width of about 700 mm and a length of about 2200 mm. This sheet was used as the heating element and was provided with intermediate taps to divide it into 12 sections which were connected in parallel.

A long cross-linked polyethylene film having a thickness of 150 microns, a width of 750 mm, and a gel fraction of 41% was drawn to be imparted with heat shrinkability. The film was then wrapped about a mandrel having an outer diameter of 700 mm to form seven turns. Then, the long heating element was wrapped and seven turns of the heat shrinkable film were formed thereon. Thus, the heating element was interposed between the 7th and the 8th turns of the total of 14 turns of the heat shrinkable film. Then a heat resistant cloth tape was applied to bind the turns. Thereafter, the assembly was heated to about 180° C. for 30 minutes to fuse together the turns. Then, the lamination was dismounted from the mandrel to obtain a heat shrinkable tube containing a heating wire. Then, a synthetic rubber type adhesive consisting essentially of EPR was coated onto the inner surface of the tube. The adhesive was in the form of a long sheet having a thickness of 1 mm and bonded with a release paper. The sheet of the adhesive was bonded to the inner surface of the tube by applying pressure with a roller with the surface of the adhesive accompanied with the release paper.

After mounting the tube on a steel pipe having an outer diameter of 600 mm, the release papers were removed and current of 95 A was passed through the heating element from a constant current source. After 5 minutes heat shrink was commenced and after 9 minute the tube was completely shrunk. Thereafter the current was reduced to 85A and this reduced current was passed for about 15 minutes to completely melt the bonding agent to fill the gap between the heat shrinkable tube and the steel tube. Then, the current was interrupted and the assembly was cooled. It was found that the bonding between the steel pipe and the heat shrinkable tube was perfect.

It should be noted that the invention is not limited to the specific examples described above and that many changes and modifications would be obvious to one skilled in the art. For example, in addition to the joints between pipes or cables, the heat shrinkable synthetic resin cover of this invention can also be used to reduce the size of an opening of a pipe or to prevent an electric cable or wire from contacting other memeber.

What is claimed is:

1. A heat shrinkable synthetic resin cover comprising a heat shrinkable synthetic resin member having a heat shrinkability in substantially one direction, and a flexible electric heating member made of a metallic elongated resistive conductor coated with a cross-linked polymer having a gel fraction of from 20 to 60% and embedded in said heat shrinkable synthetic resin member having a heat shrinkability in substantially one direction, said heating member being arranged with said metallic elongated conductor in a zig-zag form transverse to said direction of heat shrink of said heat shrinkable synthetic resin member and operable to contract upon heat shrinkage of said synthetic resin member in said direction induced by heat produced by electric current flowing through said metallic elongated resistive conductor.

2. The heat shrinkable synthetic resin cover according to claim 1 wherein said cross-linked polymer comprises a cross-linked polyethylene having a gel fraction of from 30% to 45%.

3. The heat shrinkable synthetic resin cover according to claim 1 wherein said metallic conductor comprises a strand of one or more fine metal wires.

4. The heat shrinkable synthetic resin cover according to claim 3 wherein said metal wire is made of a metal selected from a group consisting of copper, copper alloys and nickel alloys.

5. The heat shrinkable synthetic resin cover according to claim 1 wherein said heat shrinkable synthetic resin member is made of a synthetic resin selected from the group consisting of cross-linked ethylene polymers, cross-linked polyvinyl chlorides, silicone rubbers, and ethylene-propylene copolymer elastmers, said synthetic resin having a gel fraction of from 20 to 65%.

6. The heat shrinkable synthetic resin cover according to claim 5 wherein said cross-linked ethylene polymers have a gel fraction of from 30 to 50%.

7. The heat shrinkable synthetic resin cover according to claim 1 wherein the metallic conductor of said heating member is arranged in a zig-zag form and the direction of said metallic conductor is reversed near side edges of said heat shrinkable synthetic resin member, said side edges being parallel to said direction of heat shrink of said heat shrinkable synthetic resin member.

8. The heat shrinkable synthetic resin cover according to claim 1 wherein said heating member comprises a net shaped structure including a combination of a number of metallic conductors covered with said cross-linked polymer and a number of linear members of a thermoplastic resin, one acting as warps and the other as wefts.

9. The heat shrinkable synthetic resin cover according to claim 1 wherein said heat shrinkable synthetic resin member takes the form of a sheet.

10. The heat shrinkable synthetic resin cover according to claim 9 wherein said heat shrinkable synthetic resin member takes the form of a rectangular flat sheet.

11. The heat shrinkable synthetic resin cover according to claim 1 wherein said heat shrinkable synthetic resin member takes the form of a tube.

12. The heat shrinkable synthetic resin cover according to claim 11 wherein said heat shrinkable synthetic resin member comprises a layer of a bonding agent applied to the inner surface thereof.

13. The heat shrinkable synthetic resin cover according to claim 9 wherein said heat shrinkable synthetic resin member comprises a layer of a bonding agent applied to the one surface thereof.

14. The heat shrinkable synthetic resin cover according to claim 1 wherein said heating member is provided with more than two terminals.

* * * * *

UNITED STATES PATENT AND TRADEMARK OFFICE
CERTIFICATE OF CORRECTION

PATENT NO. : 4,323,607
DATED : April 6, 1982
INVENTOR(S) : Hiroshi Nishimura; Tetsuo Monma, et al It is certified that error appears in the above—identified patent and that said Letters Patent is hereby corrected as shown below:

Column 3, line 30, "120°C." should be -- 120°C --.

Column 7, line 12, "180°C." should be -- 180°C --.

Column 7, line 58, "film was" should be -- film has --.

Column 8, line 1, "200°C." should be -- 200°C --.

Column 8, line 60, "180°C." should be -- 180°C --.

Column 9, line 23, "memeber" should be -- member --.

Signed and Sealed this

Fourteenth Day of September 1982

[SEAL]

Attest:

GERALD J. MOSSINGHOFF

Attesting Officer — Commissioner of Patents and Trademarks